INVENTOR.
ERLAND WILLIAM ERICSON

Patented Aug. 15, 1933

1,922,423

UNITED STATES PATENT OFFICE 1,922,423

FLUID METER

Erland William Ericson, San Francisco, Calif., assignor to The Merrill Company, San Francisco, Calif., a Corporation of California Application August 22, 1931. Serial No. 558,654

2 Claims. (Cl. 73—37)

This invention relates generally to fluid meters of the gyrating piston type, such as are utilized for measuring flow of fluids.

In Cornell reissue Patent No. 18,067, there is disclosed and claimed a novel form of fluid meter utilizing a pair of cylindrical pistons adapted to gyrate within cylindrical piston chambers. In applying this meter to certain specific conditions, an improved construction embodying the invention of said reissue patent has been developed, which is disclosed and claimed in copending Cornell application Ser. No. 558,651 filed August 22, 1931. The improved structure of said Cornell application utilizes duplex pistons which are displaced 180 degrees apart to afford a dynamic balance.

The journal means cooperating between the pistons and the intermediate parts of the meter casing, disclosed in said Cornell application, is characterized by the fact that an independent resilience is afforded for each piston, so that each piston can pass an obstruction. It is an object of the present invention to generally improve upon the journal means disclosed in said Cornell application, whereby the resulting device is simpler in construction, more rugged and reliable in operation, and cheaper to manufacture.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Fig. 4 is a cross sectional detail taken along the line 4—4 of Fig. 2.

Fig. 5 is a perspective detail illustrating my improved form of journal means.

Figure 1:
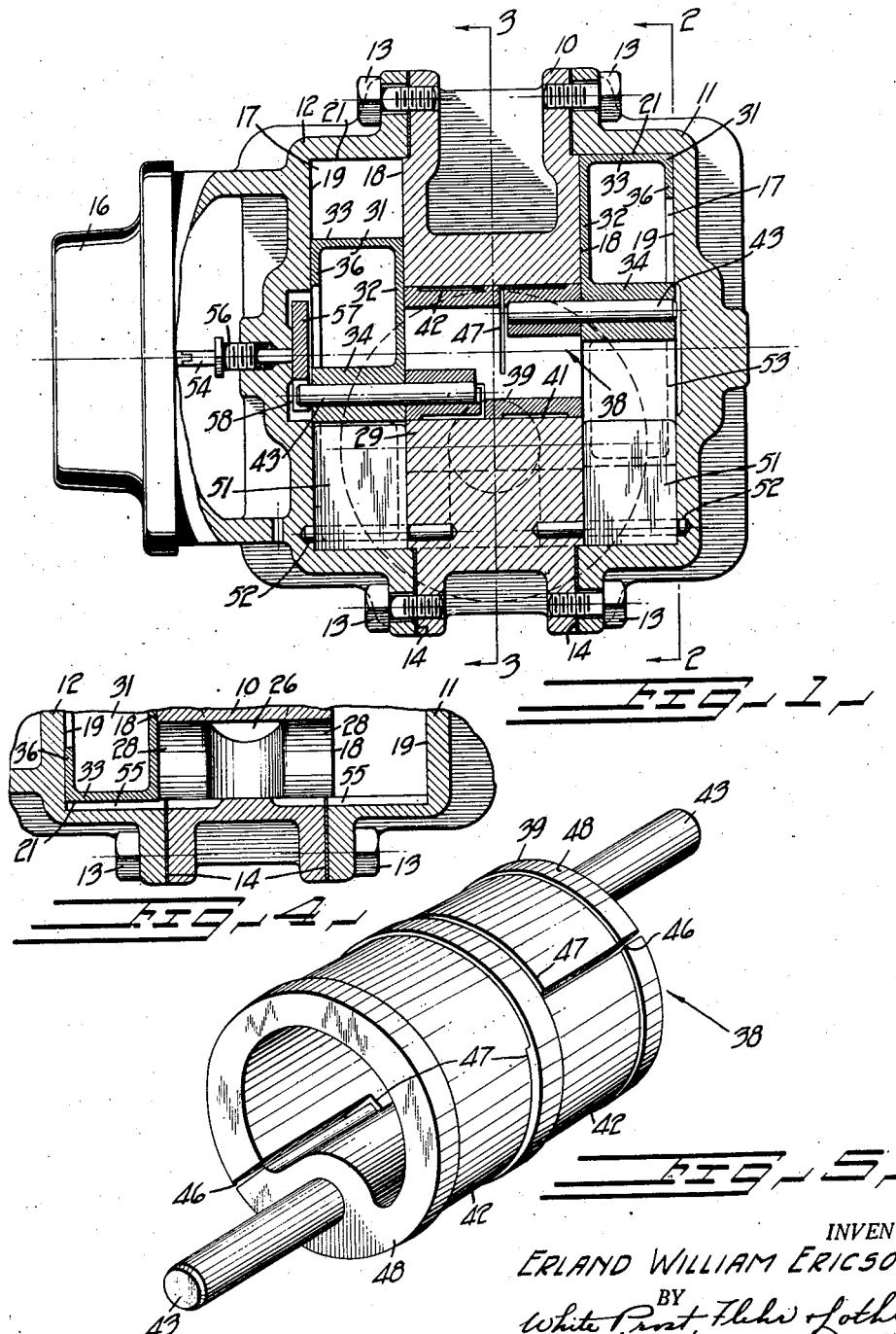
Figure 1 is a side elevational view in cross section, illustrating a meter incorporating the present invention.

Referring to Fig. 1 of the drawings, the meter of the present invention consists of a casing which is preferably formed of three parts 10, 11 and 12. These parts are shown separable and are clamped together by screws 13. Gaskets 14 can be interposed between the sections to prevent leakage. Casing section 12, which forms the upper part of the device when the meter is in normal upright position, includes a housing 16 enclosing suitable indicating means.

Casing sections 11 and 12 are formed so as to provide within the casing two cylindrical piston chambers 17. These chambers are substantially identical and are alined on a common axis. They are defined by planar inner and outer walls 18 and 19, and peripheral cylindrical walls 21. It will be noted that the inner walls 18 are formed upon the faces of the intermediate casing section 10, so that this casing section is interposed between the two piston chambers.

To provide for fluid flow thru the casing, flanged conduit portions 22 and 23 extend outwardly from opposite sides of the intermediate casing section 10, and these portions are cored to provide inlet and outlet passages 24 and 26. Inflow passage 24 communicates with two inflow ports 27, while outlet passage 26 communicates with two exhaust ports 28. An obstruction 29 separates ports 27 and 28, and also isolates inlet passage 24 from outlet passage 26. Ports 27 and 28 communicate with the piston chambers 17, thru the inner planar walls 18.

Positioned within each piston chamber 17 there is a cylindrical piston 31. While these pistons can be variously constructed, they are preferably skeletonized for lightness. Thus each piston includes an end wall 32, a cylindrical peripheral wall 33, and a central hub 34. The end of each piston opposite from wall 32 can be defined by cutaway wall 36. These pistons can be duplicates, and their diameter is substantially less than the diameter of the piston chambers, so that the pistons can gyrate within the chambers.

Cooperating between the intermediate casing section 10 and both pistons, I provide a journal means indicated generally at 38. This journal means consists of a sleeve 39, formed of suitable metal such as cast iron, which is rotatably fitted within a bore 41 formed in the intermediate casing section 10 and concentric with the common axis. A portion of the periphery of sleeve 39 can be cut away as indicated at 42 to facilitate machining operations, and to facilitate lubrication. The length of sleeve 39 is such that when the sleeve is in position as shown in Fig. 1, the ends of the sleeve are about flush with the walls 18 of the piston chambers. Mounted upon sleeve 39 and projecting from opposite ends thereof, are the journal pins 43. These pins are eccentric with respect to the axis of rotation of the sleeve, and are displaced substantially 180 degrees apart. They project thru the centers of the pistons 31, to afford bearing for the piston hubs 34.

As will be presently explained, it is desirable that journal means 38 afford a certain amount of resilience so that the pistons are capable of passing obstructions. As will be best understood by referring to Fig. 5, sleeve 39 is constructed in such a way as to afford such resilience. Thus extending inwardly from each end of sleeve 39, there is a longitudinal slot 46, and each of these longitudinal slots 46 extend to another circumferential slot 47. The extent of each slot 47 will depend upon the degree of resilience required. In practice good results have been secured, by extending the slot slightly less than half the circumference. It is evident that the positioning of these slots form portions 48 which in effect are arcuate resilient cantilever elements. Journal pins 43 are connected near the ends of each cantilever element, so that when sufficient force is applied to a pin towards the axis of rotation of the sleeve, the cantilever element is sprung inwardly a certain amount. It will be noted that the resilient elements formed by portion 48 cannot spring outwardly, because they normally have bearing upon the walls of the casing bore 41. In this connection it should also be noted that I preferably machine the parts of the meter in such a manner that there is normally slight clearance between the peripheries of the pistons and the peripheral walls 21 of the piston chambers. Such construction materially reduces the friction between the pistons and the adjacent walls of the chambers, so that head losses thru the meter are minimized.

In conjunction with the pistons 31, I utilize bridge plates 51. One end portion of each bridge plate is pivotally connected to the casing by means of pivot pin 52, so that the plate is free to oscillate. Each piston is provided with a radial slot 53 adapted to slidably receive the corresponding bridge plate 51. As shown more clearly in Fig. 2, ports 27 and 28 communicate thru the walls 18 (Fig. 1) of each piston chamber, upon opposite sides of the corresponding bridge plate 51. Grooves or recesses 55 in the casing adjacent bridge plates 51 facilitate exhaust of fluid and prevent hydraulic hammer when the parts are operating at high speed in measuring flow of liquids.

For operating indicating means contained within housing 16, there is shown a rotatable shaft 54 extending into one of the chambers 17 thru a suitable packing gland 56. A disc or other equivalent member 57 is secured to the inner end of shaft 54, and is provided with a slot 58 to receive the projecting end of the adjacent journal pin 43. Therefore when the pistons gyrate and sleeve 39 rotates together with journal pins 43, shaft 54 is rotated accordingly. Generally the indicating means includes suitable reduction gearing connected with shaft 54.

Figure 2:
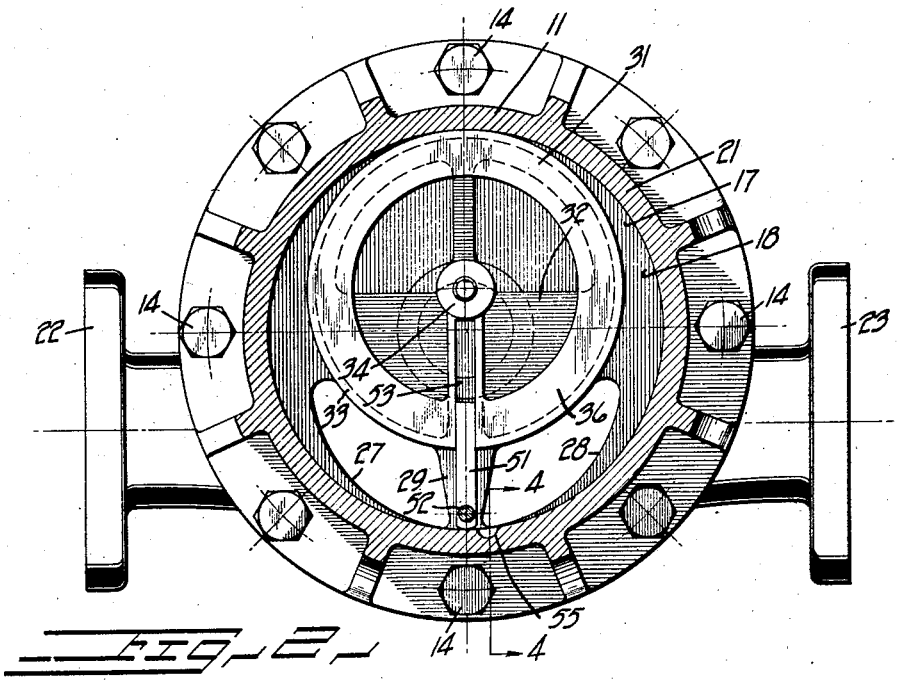
Fig. 2 is a cross sectional view taken along the line 2—2 of Fig. 1.
Figure 3:
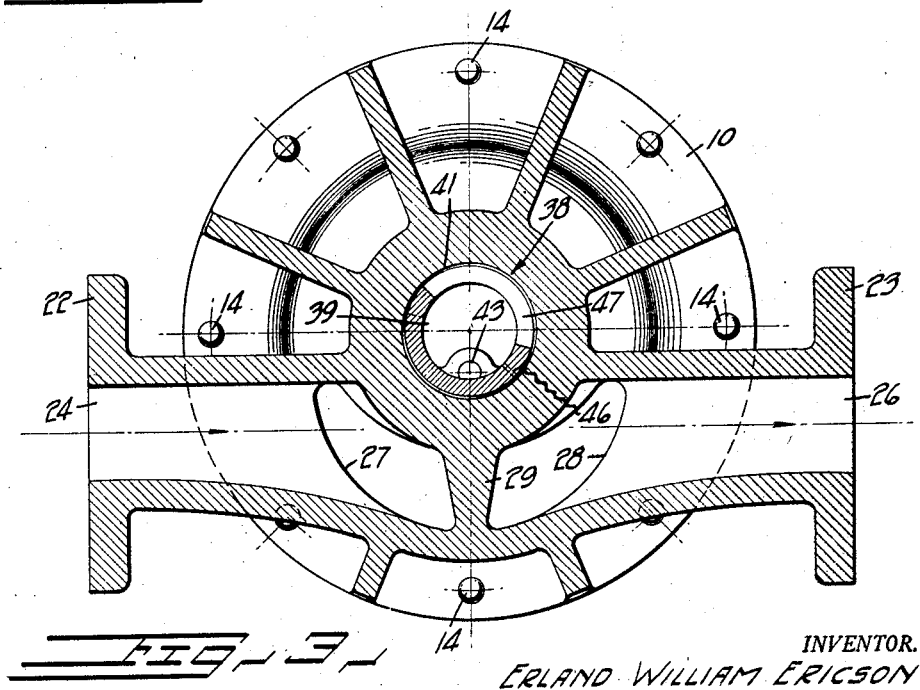
Fig. 3 is a cross sectional view taken along the line 3—3 of Fig. 1.

Operation of my meter can be briefly outlined as follows:—Assuming that a source of fluid under considerable head is connected to inlet passage 24 and that the fluid is free to escape from outflow passage 26, fluid from inlet passage 24 is free to pass thru the inflow ports 27 to the piston chambers 17. Fluid pressure within the piston chambers, acting upon the pistons in conjunction with the bridge plates 51, causes a gyrating movement of the pistons, during which movement fluid is displaced by the pistons thru exhaust ports 28 and outlet passage 26. Cutoff of ports 27 and 28 is effected by the piston end walls 32, as the pistons gyrate. Assuming for example that the piston as shown in Fig. 2 gyrates in a clockwise direction, when the piston reaches a position displaced 180 degrees from the position shown in Fig. 2, both ports 27 and 28 are cut off. Upon further gyration back to the position shown in Fig. 2, both ports 27 and 28 are open. If a piece of foreign matter passes into the meter casing together with the fluid being measured, and becomes lodged between the peripheral walls 33 of one of the pistons and the adjacent peripheral chamber wall 21, that piston is permitted to give a certain amount in its gyration to pass over the obstruction, by virtue of the resilient nature of sleeve 39. However in spite of such give afforded by sleeve 39, the pistons are adequately journaled by pins 43 so that they can rotate at high speed without undue friction and without undue mechanical vibration.

I claim:

1. In a fluid meter, a casing formed to provide two cylindrical piston chambers alined on a common axis, cylindrical pistons disposed within said chambers and adapted to have gyrating movement therein, said chambers being separated by an intermediate part of the casing, and journal means cooperating between said casing part and said pistons, said journal means comprising a sleeve journaled in said casing part in alinement with said common axis, eccentric connections between the end portions of said sleeve and said pistons, said sleeve incorporating cantilever like resilient elements forming portions of the sleeve, the eccentric connections being to the free ends of said cantilever elements, whereby each eccentric connection can be independently sprung toward the axis of rotation of the sleeve.

2. In a fluid meter, a casing formed to provide two cylindrical piston chambers alined on a common axis, cylindrical pistons, disposed within said chambers and adapted to have gyrating movement therein, said chambers being separated by an intermediate part of the casing, and journal means cooperating between said casing part and said pistons, said journal means comprising a sleeve journaled in said casing part and having its axis of rotation alined with said common axis of the piston chambers, journal pins carried by the ends of said sleeve and connected to said pistons, the axes of said journal pins being eccentric thereto and spaced upon opposite sides of the common axis of the piston chambers, the sleeve being slotted longitudinally and circumferentially whereby certain arcuate portions of the sleeve are caused to constitute resilient cantilever elements having their free ends connected to said journal pins.

ERLAND WILLIAM ERICSON.